United States Patent Office 3,166,578
Patented Jan. 19, 1965

3,166,578
(OPTIONALLY 17-ALKYLATED) 17-OXYGENATED
5α - ANDROST-2-EN-4-ONES AND INTERMEDIATES THERETO
Paul D. Klimstra, Northbrook, Ill., assignor to G. D. Searle & Co., Chicago, Ill., a corporation of Delaware
No Drawing. Filed Nov. 12, 1963, Ser. No. 323,063
14 Claims. (Cl. 260—397.3)

The present invention is concerned with novel 4-ketosteroids of the androstane series and, more particularly, with (optionally 17-alkylated) 17-oxygenated 5α-androst-2-en-4-ones represented by the structural formula

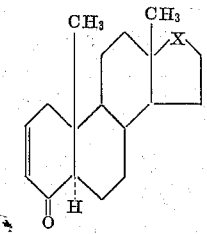

wherein X is a carbonyl, β-hydroxymethylene, β-(lower alkanoyl)oxymethylene, or α-(lower alkyl)-β-hydroxymethylene radical.

Those novel compounds can be obtained by processes utilizing the novel intermediates designated by the following structural formula

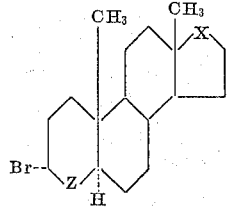

wherein X is as defined above and Z is a carbonyl or β-hydroxymethylene radical.

In the foregoing structural representations, the lower alkyl radicals encompassed in the X substituent are exemplified by methyl, ethyl, isopropyl, secondary-butyl, tertiary-pentyl, hexyl, and heptyl, while the lower alkanoyl radicals designated therein are typified by acetyl, propionyl, butyryl, valeryl, caproyl, heptanoyl, and the branched-chain groups isomeric therewith, said radicals containing fewer than 8 carbon atoms.

The 4-keto-Δ² compounds of this invention display valuable pharmacological properties as evidenced by their hormonal and anti-hormonal activity. They are, for example, anabolic, androgenic, anti-estrogenic, and anti-fertility agents.

Starting materials suitable for use in the manufacture of the novel substances comprising the present invention are defined by the following structural formula

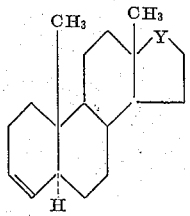

wherein Y in indicative of a carbonyl, β-hydroxymethylene, or β-(lower alkanoyl)oxymethylene radical. Those substances are converted to the corresponding 3α,4β-bromohydrins by reaction with aqueous hypobromous acid. That reagent is preferably prepared in situ, for example from a mixture of N-bromosuccinimide and aqueous perchloric acid. Oxidation of the 3α,4β-bromohydrins thus obtained, typically with chromium trioxide in aqueous acid medium, affords the 4-keto derivatives corresponding. Dehydrobromination of the latter 3α-bromo-4-keto intermediates creates a doubly bonded unsaturated linkage at the 2,3-position, thus producing the instant 4-keto-Δ² compounds. The foregoing processes are specifically illustrated by the reaction of 5α-androst-3-en-17β-ol 17-acetate with N-bromosuccinimide in aqueous perchloric acid to yield 3α-bromo-5α-androstane-4β,17β-diol 17-acetate, oxidation of that bromohydrin with chromium trioxide in aqueous acetic acid, resulting in 17β-acetoxy-3α-bromo-5α-androstan-4-one, and dehydrobromination of the latter substance with a mixture of lithium chloride and lithium carbonate in dimethylformamide to produce the instant 17β-acetoxy-5α-androst-2-en-4-one.

Hydrolysis of the instant 17β-(lower alkanoyl)-oxy-5α-androst-2-en-4-ones, typically with aqueous potassium hydroxide in methanol, provides another method for the manufacture of the instant 17β-hydroxy-5α-androst-2-en-4-one. The latter 17β-ol can alternatively serve as the starting material for manufacture of the corresponding alkanoyl esters. Acylation with a lower alkanoic acid halide or anhydride in the presence of a suitable acid acceptor is a preferred procedure. In that manner, 17β-hydroxy-5α-androst-2-en-4-one is contacted with propionic anhydride and pyridine to yield the 17-propionate thereof.

The 17-alkylated compounds of this invention are conveniently obtained by conversion of the aforementioned 5α-androst-3-en-17-one to a 17α-(lower alkyl)-5α-androst-3-en-17β-ol by reaction with a suitable alkyl organometallic reagent, and subsequent application of the aforementioned bromohydrination, oxidation, and dehydrobromination reactions to those intermediates. As a specific example, 5α-androse-3-en-17-one is contacted with ethyl magnesium bromide in ether solution, and the resulting adduct is hydrolyzed in aqueous ammonium chloride to produce 17α-ethyl-5α-androst-3-en-17β-ol. Transformation of that substance to the instant 17α-ethyl-17β-hydroxy-5α-androst-2-en-4-one is effected by processes analogous to those detailed hereinbefore.

The following examples describe in detail certain of the compounds illustrative of the present invention and methods which have been devised for their manufacture. The invention, however, is not to be construed as limited thereby either in spirit or in scope since it will be apparent to those skilled in the art that many modifications both of materials and of methods may be practiced without departing from the purpose and intent of the disclosure. In the examples hereinafter detailed, temperatures are given in degrees centigrade (° C.) and quantities of materials in parts by weight unless otherwise noted.

*Example 1*

A solution of 2.5 parts of 5α-androst-3-en-17-one in 60 parts of dioxane, under nitrogen, is cooled by means of a water bath while 2 parts of N-bromosuccinimide, 1.7 parts of 60% aqueous perchloric acid, and 18 parts of water were added successively with stirring over a period of about 5 minutes. That reaction mixture is stirred at room temperature for about 4 hours, then is quenched by pouring into cold water containing 0.01 part of sodium thiosulfate. The resulting precipitate is isolated by vacuum filtration, washed with water and dried to afford 3α-bromo-4β-hydroxy-5α-androstan-17-one, melting at about 226–228°. It is characterized further by an optical rotation of +60° in chloroform and can be represented by the structural formula

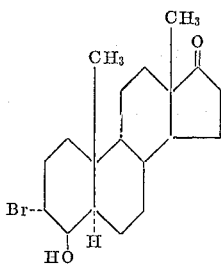

*Example 2*

To a solution of 3 parts of 3α-bromo-4β-hydroxy-5α-androstan-17-one in 120 parts of acetone, obtained by warming a mixture of those two components, is added dropwise, at room temperature, an aqueous solution, 8 N in chromium trioxide and 8 N in sulfuric acid, until an excess of the reagent is present as evidenced by the persistence of an orange color. The excess reagent is destroyed by the addition of a small quantity of isopropyl alcohol, and the preciptated inorganic salts are removed by filtration. The filtrate thus obtained is poured into a mixture of ice and water, resulting in precipitation of the product which is washed on the filter with water and dried in air to yield 3α-bromo-5α-androstane-4,17-dione, melting at 145–146°. It is characterized further by infrared absorption maxima at about 3.4, 5.72, and 5.80 microns and also by the structural formula

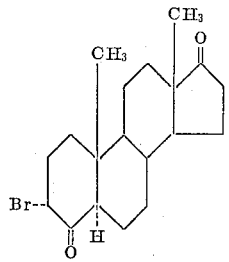

*Example 3*

A mixture of 2.75 parts of 3α-bromo-5α-androstane-4,17-dione, 1.6 parts of lithium chloride, one part of lithium carbonate, and 70 parts of dimethylformamide is heated at the reflux temperature for about 3 hours in an atmosphere of nitrogen. The reaction mixture is then cooled to room temperature and poured into water, and the resulting aqueous mixture is extracted with ether. Washing of that organic solution with dilute hydrochloric acid followed by drying over anhydrous postassium carbonate containing decolorizing carbon affords an organic solution, which is stripped of solvent by distillation at reduced pressure to afford the crude product. Recrystallization from acetone-hexane affords pure 5α-androst-2-ene-4,17-dione, melting at about 172–175° and displaying infrared absorption maxima at about 3.4, 5.73, 5.94, and 6.14 microns in addition to an ultraviolet absorption peak at about 227 millimicrons with a molecular extinction coefficient of about 7200. This substance can be represented by the structural formula

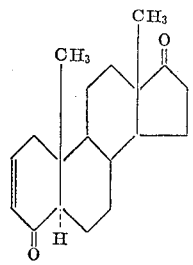

*Example 4*

To a solution of 16 parts by volume of 3 molar methyl magnesium bromide in 14 parts of ether is added dropwise, with stirring over a period of about 15 minutes, a solution of 0.8 part of 5α-androst-3-en-17-one in 14 parts of ether. The reaction mixture is heated at the reflux temperature for about 16 hours, then is poured slowly into a mixture of ice and water containing 8 parts of ammonium chloride. The resulting aqueous mixture is extracted with ether, and the ether layer is separated, washed successively with dilute hydrochloric acid and 5% aqueous sodium bicarbonate, then dried over anhydrous potassium carbonate containing decolorizing carbon. Removal of the solvent by distillation affords a residue which is crystallized from aqueous methanol to yield 17α-methyl-5α-androst-3-en-17β-ol, characterized by a melting point of 139.5–140° and an optical rotation of +30° in chloroform.

*Example 5*

To a solution of 8 parts of 17α-methyl-5α-androst-3-en-17β-ol in 85 parts of dioxane, under nitrogen, is added with slight cooling a solution of 1.5 parts of 60% perchloric acid and 2.6 parts of N-bromosuccinimide in 30 parts of water. That reaction mixture is stirred at room temperature for about 4 hours, then is poured carefully into approximately 3000 parts of a mixture of ice and water. The precipitate which forms is collected by filtration, washed on the filter with water, then recrystallized from methanol to afford pure 3α-bromo-17α-methyl-5α-androstane-4β,17β-diol, melting at about 182–184° with decomposition. Infrared absorption maxima are observed at about 2.75 and 3.4 microns. The following illustration structurally represents this substance

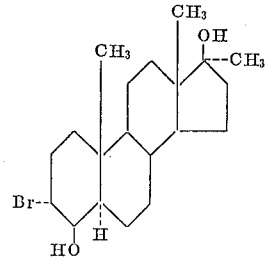

*Example 6*

A solution of 1.05 parts of chromium trioxide in 15 parts of acetic acid is added dropwise over a period of about 15 minutes, with stirring and cooling, to a solution of 2.35 parts of 3α-bromo-17α-methyl-5α-androstane-4β,17β-diol in 35 parts of acetic acid, and the reaction mixture thus obtained is stirred at room temperature for about 16 hours. At the end of that time, the solution is poured carefully into a mixture of ice and water, and the resulting precipitate is isolated by filtration, then washed with water and dried in air. Recrystallization of that crude product from aqueous methanol affords pure 3α - bromo-17β-hydroxy-17α-methyl-5α-androstan-4-one, melting at about 130.5–133° and characterized further by an optical rotation of −141° in chloroform. It can be represented by the following structural formula

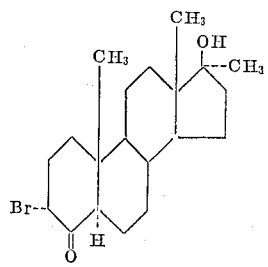

Example 7

To a solution of 10 parts of 3α-bromo-17β-hydroxy-17α-methyl-5α-androstan-4-one in 250 parts of dimethylformamide is added successively 5.2 parts of lithium chloride and 3.5 parts of lithium carbonate, and that reaction mixture is heated at the reflux temperature for about 3 hours in an atmosphere of nitrogen, then is stored at room temperature for about 16 hours. At the end of that time, the reaction mixture is diluted by the addition of about 500 parts of water, and that aqueous mixture is extracted with ether. Successive washings of the ether extract with dilute hydrochloric acid, water, and 5% aqueous sodium bicarbonate followed by drying over anhydrous sodium sulfate containing decolorizing carbon and removal of the solvent by distillation at reduced pressure affords the crude product as a glass. That glassy substance is recrystallized from a mixture of acetone and hexane, thus affording pure 17β-hydroxy-17α-methyl-5α-androst-2-en-4-one, which displays a melting point at about 132–136° and is characterized further by an ultraviolet absorption peak at about 225.5 millimicrons with a molecular extinction coefficient of about 7248. It can be represented by the following structural illustration

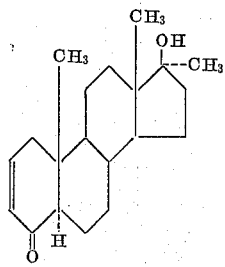

Example 8

A solution of 5 parts of 5α-androst-3-en-17β-ol 17-acetate in 100 parts of dioxane is stirred in a nitrogen atmosphere while 4 parts of N-bromosuccinimide, 3.4 parts of 60% perchloric acid, and 35 parts of water are added successively over a period of about 5 minutes with cooling by means of a water bath. Stirring of the resulting reaction mixture is continued at room temperature for about 3½ hours, after which time it is poured into a mixture of ice and water containing 0.01 part of sodium thiosulfate. The precipitate which forms is collected by filtration, then is washed with water and dried in air to afford the crude product. Recrystallization from methanol affords pure 3α-bromo-5α-androstane-4β,17β-diol 17-acetate, displaying a melting point at about 166–168° and an optical rotation in chloroform of −4.5°. The following formula illustrates its structure

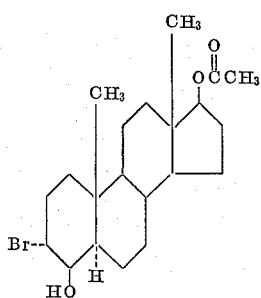

Example 9

To a solution of 3 parts of 3α-bromo-5α-androstane-4β,17β-diol 17-acetate in 40 parts of acetic acid is added, at 0–5° with stirring over a period of about 30 minutes, a solution of 1.3 parts of chromium trioxide in 24 parts of acetic acid containing 1.4 parts of water. Stirring of the resulting reaction mixture is continued at room temperature for about 16 hours, following which period of time that mixture is poured carefully into a mixture of ice and water. The precipitate which results is collected by filtration, washed on the filter with water, and dried in air. The crude product thus obtained is recrystallized from aqueous methanol to yield 17β-acetoxy-3α-bromo-5α-androstan-4-one hemihydrate, melting at about 130–132°. It is characterized further by the structural formula

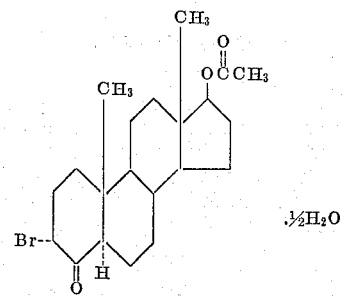

Example 10

To a solution of 24 parts of 17β-acetoxy-3α-bromo-5α-androstan-4-one in 600 parts of dimethylformamide is added 8.5 parts of lithium carbonate and 13 parts of lithium chloride, and that reaction mixture is heated at the reflux temperature for about 3½ hours, then is stored at room temperature for about 16 hours. Dilution with approximately 500 parts of water affords an aqeous mixture which is extracted with ether. The aqueous layer is separated, acidified by means of dilute hydrochloric acid, then extracted with ether. The combined ether solutions are washed successively with dilute hydrochloric acid, 5% aqueous sodium bicarbonate, and water, then dried over anhydrous sodium sulfate containing decolorizing carbon. Distillation of the solvent at reduced pressure affords an oily residue which solidifies on standing. That crude product is recrystallized from aqueous methanol to yield pure 17β-acetoxy-5α-androst-2-en-4-one, melting at about 182–184° and characterized further by an optical rotation of +7.5° in chloroform. It displays an ultraviolet absorption peak at about 226 millimicrons with a molecular extinction coefficient of about 7500 and can be represented by the following structural formula

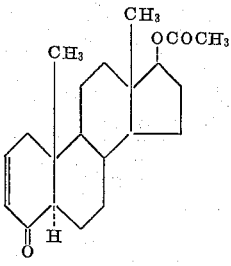

Example 11

To a solution of 8 parts of 17β-acetoxy-5α-androst-2-en-4-one in 560 parts of methanol is added a solution of 20 parts of potassium hydroxide in 200 parts of water, and the resulting reaction mixture is heated at the reflux temperature for about 30 minutes. Cooling to 0–5° followed by dilution with water results in precipitation of the desired product, which is collected by filtration and dried to afford 17β-hydroxy-5α-androst-2-en-4-one, characterized by a melting point of about 150–160° and also by infrared absorption peaks at about 2.75, 3.4, 5.95, and 6.1 microns. Its structure is illustrated by the following representation

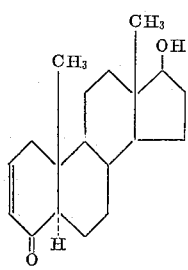

Example 12

A mixture of one part of 17β-hydroxy-5α-androst-2-en-4-one, 13 parts of propionic anhydride, and 20 parts of pyridine is allowed to stand at room temperature for about 16 hours, then is poured carefully into approximately 200 parts of water. The aqueous mixture which results is extracted with ether, and the organic layer is separated, washed successively with water, dilute hydrochloric acid, and water, then dried over anhydrous sodium sulfate. Distillation of the solvent at reduced pressure affords a crystalline residue consisting of 17β-propionoxy-5α-androst-2-en-4-one, characterized by the structural formula

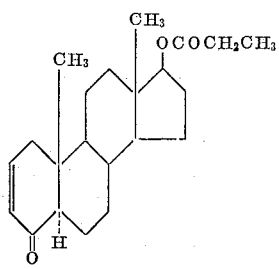

Example 13

To 28 parts of a 3 molar solution of ethyl magnesium bromide in ether is added, over a period of about 10 minutes with stirring, a solution of 2 parts of 5α-androst-3-en-17-one in 28 parts of ether. The resulting reaction mixture is heated at the reflux temperature for about 16 hours, then is poured into ice-cold saturated aqueous ammonium chloride, and the resulting aqueous mixture is extracted with ether. The ether solution is washed successively with water and 5% aqueous sodium bicarbonate, then is dried over anhydrous potassium carbonate containing decolorizing carbon. The solvent is distilled at reduced pressure to afford an oily residue which is recrystallized from aqueous methanol to yield 17α-ethyl-5α-androst-3-en-17β-ol, characterized by infrared absorption maxima at about 2.75, 3.4, and 6.02 microns.

To a solution of 5 parts of 17α-ethyl-5α-androst-3-en-17β-ol in 100 parts of dioxane is added over a period of about 5 minutes, with cooling by means of a water bath and stirring in a nitrogen atmosphere, a solution of 10 parts of N-bromosuccinimide and 3.4 parts of 60% aqueous perchloric acid in 35 parts of water. Stirring is continued at room temperature for about 4 hours, and the reaction mixture is then poured into water containing crushed ice. The precipitate which forms is collected by filtration, washed on the filter with water and dried in air. Recrystallization from methanol results in 3α-bromo-17α-ethyl-5α-androstane-4β,17β-diol, which exhibits characteristic infrared absorption peaks at about 2.75 and 3.4 microns.

Example 14

The oxidation of 2.44 parts of 3α-bromo-17α-ethyl-5α-androstane-4β,17β-diol by the procedure described in Example 6 results in 3α-bromo-17α-ethyl-17β-hydroxy-5α-androstan-4-one.

Example 15

By substituting 10.37 parts of 3α-bromo-17α-ethyl-17β-hydroxy-5α-androstan-4-one and otherwise proceeding according to the processes described in Example 7, 17α-ethyl-17β-hydroxy-5α-androst-2-en-4-one is obtained. It is represented by the structural formula

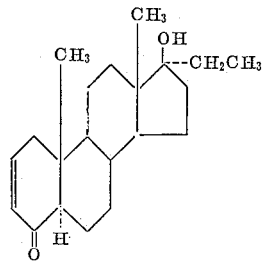

Example 16

The substitution of 2.5 parts of 5α-androst-3-en-17β-ol in the procedure described in Example 1 results in 3α-bromo-5α-androstane-4β,17β-diol of the structural formula

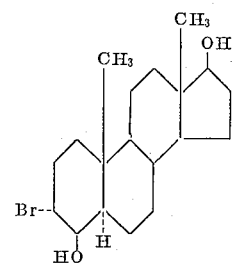

Example 17

By substituting one part of 5α-androst-3-en-17β-ol and otherwise proceeding according to the processes of Example 12, 5α-androst-3-en-17β-ol 17-propionate is obtained.

The substitution of 5.2 parts of 5α-androst-3-en-17β-ol 17-propionate in the procedure of Example 8 results in 3α-bromo-5α-androstane-4β,17β-diol 17-propionate, characterized by the structural formula

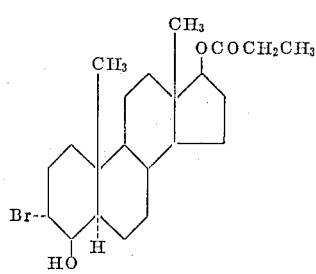

Example 18

The oxidation of 3.1 parts of 3α-bromo-5α-androstane-4β,17β-diol 17-propionate by the processes of Example 9 results in 3α-bromo-17β-propionoxy-5α-androstan-4-one. It is represented by the structural formula

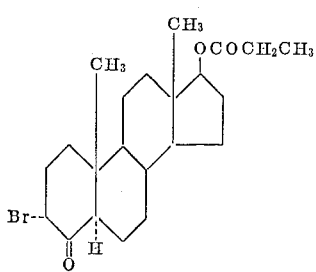

Example 19

The hydrolysis of 10 parts of 17β-acetoxy-3α-bromo-5α-androstan-4-one by the procedure of Example 11 affords a mixture of the 3α- and 3β-epimers of 3-bromo-17β-hydroxy-5α-androstan-4-one. Those epimers are separated by chromatography on neutral alumina followed by elution with 15% ethyl acetate in benzene, thus producing 3α-bromo-17β-hydroxy-5α-androstan-4-one of the structural formula

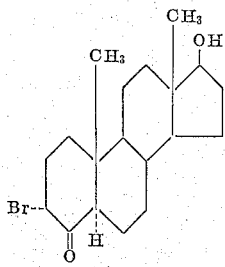

Example 20

Dehydrobromination of 25 parts of 3α-bromo-17β-propionoxy-5α-androstan-4-one by the procedure described in Example 10 results in 17β-propionoxy-5α-androst-2-en-4-one, identical with the product of Example 12.

Example 21

The substitution of 2.75 parts of 3α-bromo-17β-hydroxy-5α-androstan-4-one in the processes of Example 3 results in 17β-hydroxy-5α-androst-2-en-4-one, identical with the product of Example 11.

What is claimed is:
1. A compound of the formula

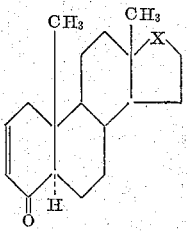

wherein X is a member of the class of radicals consisting of carbonyl, β-hydroxymethylene, β-(lower alkanoyl)oxymethylene, and α-(lower alkyl)-β-hydroxymethylene.

2. 5α-androst-2-ene-4,17-dione.
3. 17β-hydroxy-5α-androst-2-en-4-one.
4. A compound of the formula

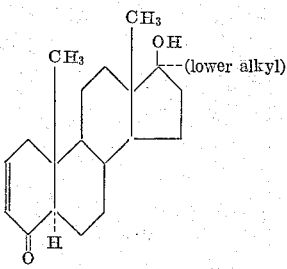

5. 17β-hydroxy-17α-methyl-5α-androst-2-en-4-one.
6. A compound of the formula

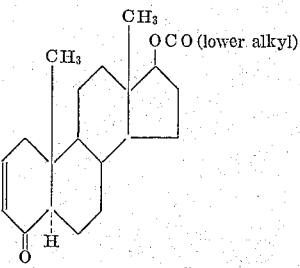

7. 17β-acetoxy-5α-androst-2-en-4-one.
8. A compound of the formula

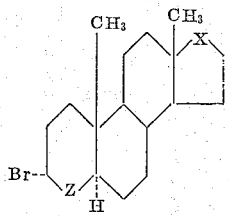

wherein X is selected from the group of radicals consisting of carbonyl, β-hydroxymethylene, β-(lower alkanoyl)oxymethylene, and α-(lower alkyl)-β-hydroxymethylene, and Z is a member of the class of radicals consisting of carbonyl and β-hydroxymethylene.

9. 3α-bromo-4β-hydroxy-5α-androstan-17-one.
10. 3α-bromo-5α-androstane-4,17-dione.
11. 3α-bromo-17α-methyl-5α-androstane-4β,17β-diol.
12. 3α-bromo-17β-hydroxy-17α-methyl-5α-androstan-4-one.
13. 3α-bromo-5α-androstane-4β,17β-diol 17-acetate.
14. 17β-acetoxy-3α-bromo-5α-androstan-4-one.

No references cited.